(12) United States Patent
Geltser et al.

(10) Patent No.: US 6,659,304 B2
(45) Date of Patent: Dec. 9, 2003

(54) CASSETTES FOR SYSTEMS WHICH FEED, COUNT AND DISPENSE DISCRETE OBJECTS

(75) Inventors: Aleksandr Geltser, Stamford, CT (US); Vladimir Gershman, Stamford, CT (US)

(73) Assignee: Kirby-Lester, Inc., Stamford, CT (US)

( * ) Notice: Subject to any disclaimer, the term of this patent is extended or adjusted under 35 U.S.C. 154(b) by 73 days.

(21) Appl. No.: 09/991,435

(22) Filed: Nov. 16, 2001

(65) Prior Publication Data

US 2002/0179628 A1 Dec. 5, 2002

Related U.S. Application Data

(63) Continuation-in-part of application No. 09/871,531, filed on May 31, 2001, and a continuation-in-part of application No. 09/871,532, filed on May 31, 2001, and a continuation-in-part of application No. 09/871,533, filed on May 31, 2001.

(51) Int. Cl.⁷ .................................................. G07F 11/00
(52) U.S. Cl. .......................................... 221/7; 221/277
(58) Field of Search ............................ 221/2, 7, 13, 9, 221/197, 278, 277, 281, 203, 258

(56) References Cited

U.S. PATENT DOCUMENTS

| | | | |
|---|---|---|---|
| 3,215,310 A | 11/1965 | Hurst et al. | 221/7 |
| 3,368,713 A | 2/1968 | Hurst et al. | 221/7 |
| 3,746,211 A | * 7/1973 | Burgess, Jr. | 221/7 |
| 4,111,332 A | 9/1978 | Hurst et al. | 221/7 |
| 4,869,394 A | 9/1989 | Hurst | 221/7 |
| 5,720,154 A | 2/1998 | Lasher et al. | 53/411 |
| 5,765,606 A | 6/1998 | Takemasa et al. | 141/104 |
| 5,865,342 A | 2/1999 | Ito et al. | 221/265 |
| 5,897,024 A | * 4/1999 | Coughlin et al. | 221/135 |
| 6,036,812 A | 3/2000 | Williams et al. | 156/277 |
| 6,085,938 A | 7/2000 | Couglin | 221/203 |

* cited by examiner

Primary Examiner—Kenneth W. Noland
(74) Attorney, Agent, or Firm—Gordon & Jacobson, P.C.

(57) ABSTRACT

A high capacity cassette for an object counting and dispensing system includes a substantially horizontal base including an exit hole, a peripheral wall about the base and having an internal periphery, the base and the peripheral wall defining a reservoir adapted to store a plurality of the discrete objects, and a structure about the internal periphery which feeds the discrete objects single file toward said exit hole.

24 Claims, 16 Drawing Sheets

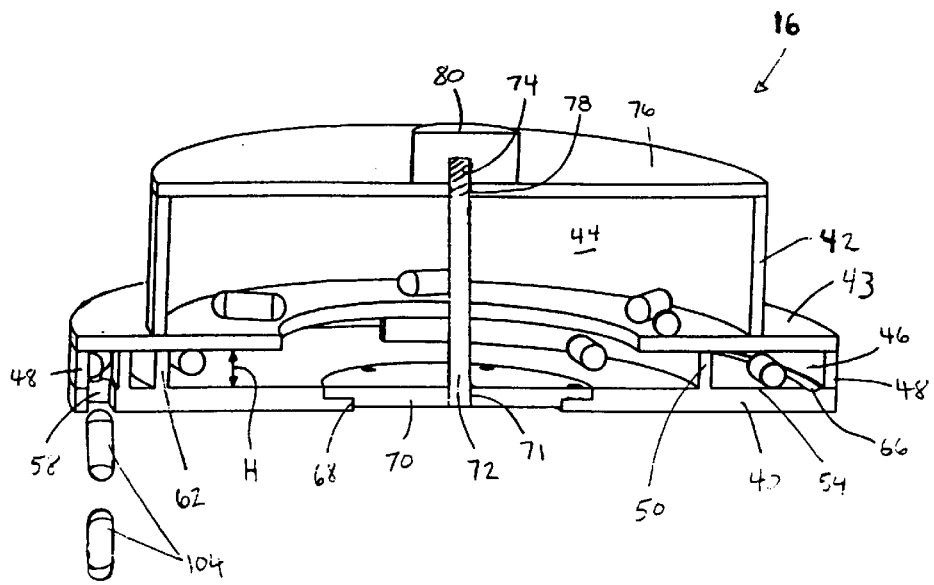
FIG. 8
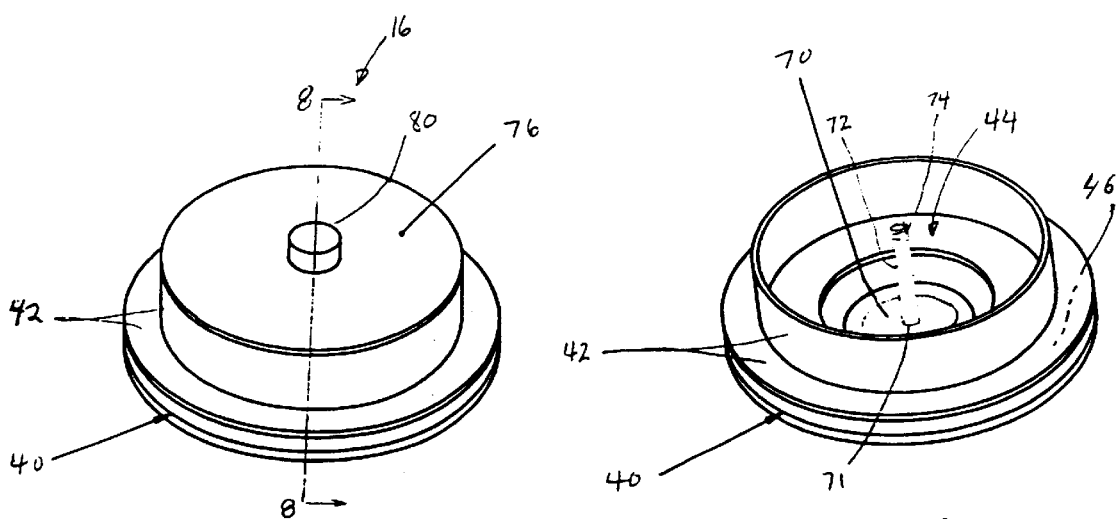
FIG. 7
FIG. 9

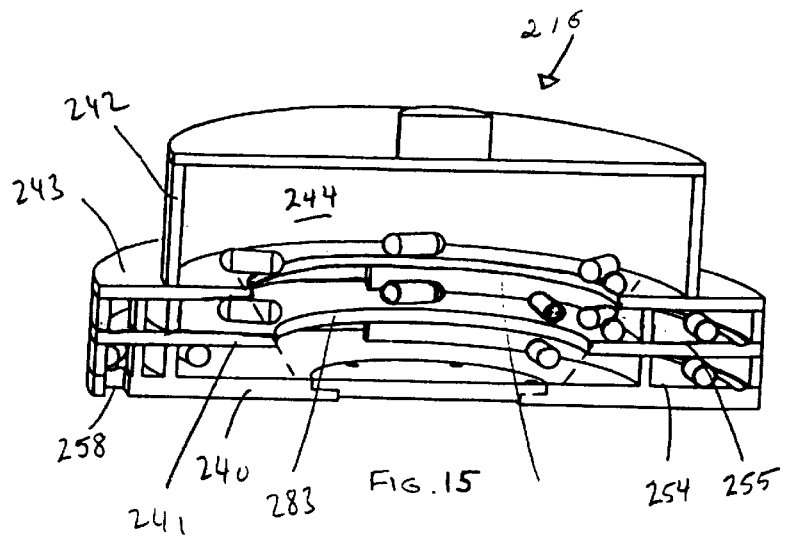
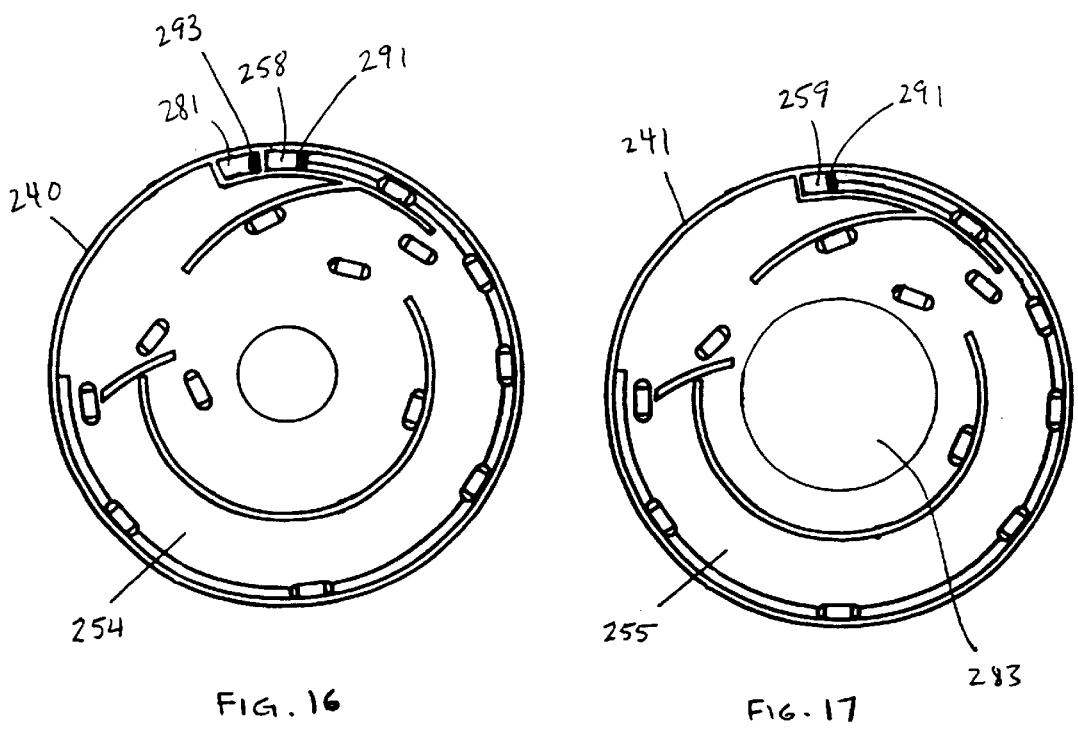

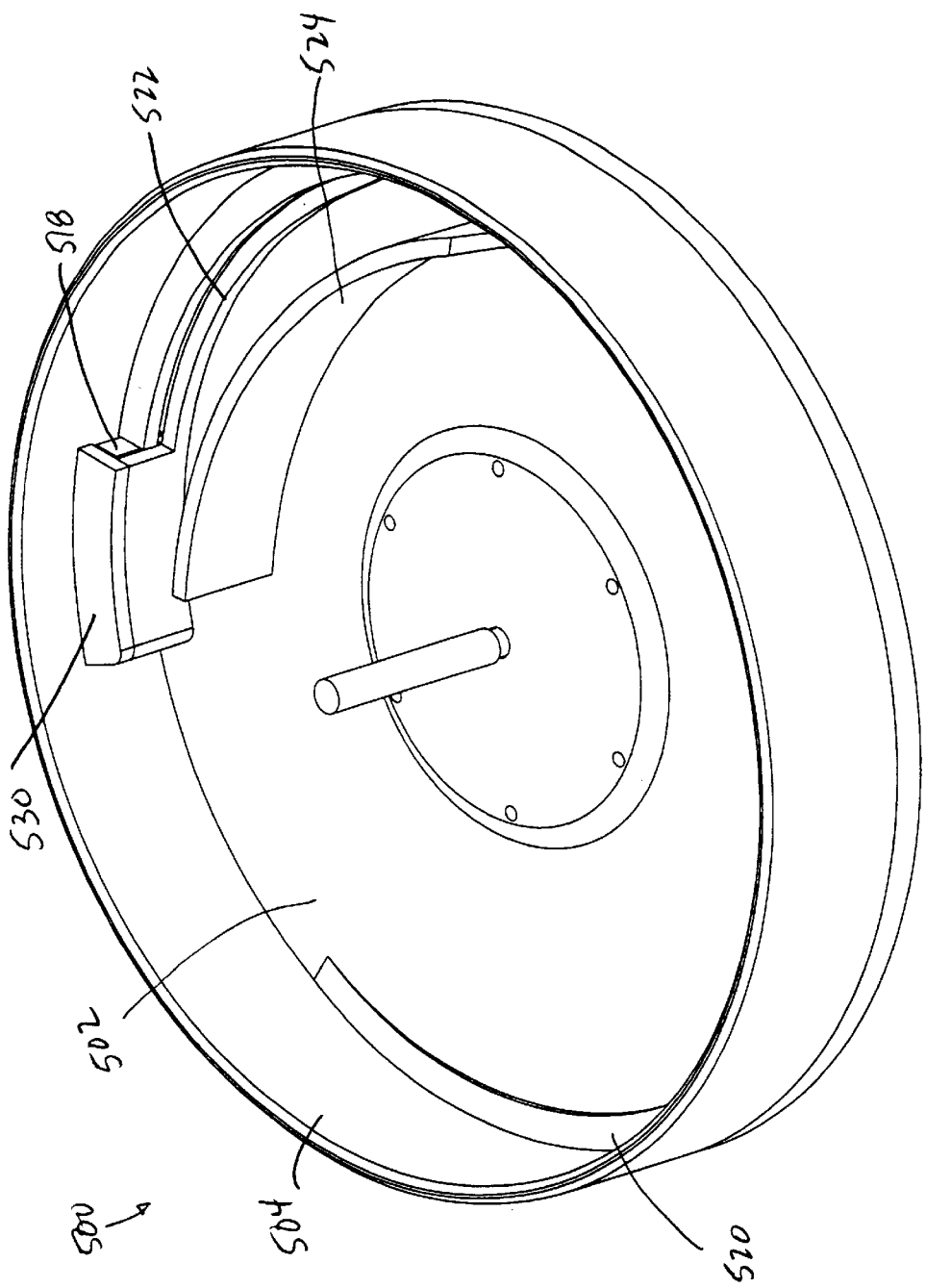

CASSETTES FOR SYSTEMS WHICH FEED, COUNT AND DISPENSE DISCRETE OBJECTS

This application is a continuation-in-part of U.S. Ser. Nos. 09/871,531 now Pub. No. 20020/79623, U.S. Ser. No. 09/871,532 now Pub. No. 6497339/20020/79619, and U.S. Ser. No. 09/871,533 now Pub. No. 20020/79621, each of which was filed on May 31, 2001, and all of which are hereby incorporated by reference herein in their entireties.

BACKGROUND OF THE INVENTION

1. Field of the Invention

This invention relates broadly to feeding, counting and dispensing apparatus. More particularly, this invention relates to feeding and counting apparatus which use vibration to control the flow of discrete items, such as tablets, capsules or caplets being fed and counted.

2. State of the Art

In retail, hospital, and mail order medication dispensing, a large number of different prescriptions of single dose medications, such as tablets, must be filled. (Hereinafter, for purposes of brevity, reference to "tablets" should be understood for purposes herein as being generic to tablets, capsules, caplets and any other solid dose medication). For prescriptions requiring small quantities of a medication, the prescription is often filled by hand; that is, a bulk container containing the prescription medication is removed from a shelf and opened. A quantity of the medication is poured into a tray and the medication tablets are counted by a pharmacist and then dispensed into a patient prescription bottle. The remainder of the medication in the tray is returned to the bulk container, the container is closed, and then replaced on the shelf.

Larger quantity prescriptions are often filled with the aid of a counting apparatus intended to more rapidly count different quantities of different tablets successively. For example, a prescription for ninety tablets of 10 mg Claritin® may need to be filled after a prescription for sixty tablets of 400 mg Motrin®. Generally, there are two types of counting apparatus available for dispensing prescription medication from bulk containers of such medications: a preset counter and a pour-through counter.

With a preset counter, the pharmacist obtains a bulk container of a prescription medication from a shelf and then pours from the container a quantity of tablets into a hopper of the counting apparatus. The pharmacist then sets the counting apparatus to the number of tablets to be counted, e.g., ninety. Assuming at least the required number of tablets for the prescription has been poured into the hopper, the pharmacist waits while the counting apparatus counts the required number of tablets and dispenses the tablets into a patient prescription bottle. The excess tablets are discharged back into the bulk container, which is then replaced on the shelf. It has been found that the time taken to discharge the excess tablets can be equal to or greater than the time required to count the prescription. For that reason, the pour-through counter has proved more popular.

A pour-through counter does not include a hopper that temporarily stores the medication. Rather, the pharmacist pours tablets from a bulk container directly into a funnel which drops the tablets past a counter and dispenses them into a patient bottle. The pharmacist pours until the digital readout of the counter apparatus displays the required number of tablets, and then stops. As such, there is usually no excess. However, should an extra tablet or so fall into the funnel, the readout clearly indicates the extra number, and the excess can easily be removed by the pharmacist and returned to the storage container.

Both the preset and pour-through counter systems have a common drawback. Each prescription medication must be obtained from a bulk storage container located in stock, which must be opened prior to use and closed after use. In order to minimize the time taken to dispense a prescription, counter manufacturers have provided "cassette counters" for retail, hospital, and mail order pharmacies. Each cassette is designed for a specific size and shape capsule, tablet, or caplet. The cassettes are prefilled by the pharmacist with bulk quantities of the appropriate prescription drugs, and are used to store bulk quantities rather than using the container supplied by the manufacturer. The prescription medication is then dispensed directly from the cassette. The use of cassettes eliminates the time needed to open the manufacturer's original container, the time needed to return excess tablets to the container, and the time needed to close the container. Unfortunately, cassette counters are slow and prone to breaking tablets. Furthermore, when cassettes jam, as they often do, they are difficult to unclog. Often tablets spill uncontrollably from the cassette during attempts to unclog a jam. Further, since the cassettes used in existing cassette systems are specific to the tablet being dispensed, each time a pharmacist wants to count a new drug, a new cassette designed for that specific medication must be obtained. In addition, some prescriptions are filled infrequently and it is not economically feasible or practical to have a dedicated cassette for every solid dose medication in the pharmacy.

SUMMARY OF THE INVENTION

It is therefore an object of the invention to provide a system for counting and dispensing discrete objects such as tablets, capsules and the like which permits storing discrete objects in a manner in which the objects may be quickly dispensed.

It is another object of the invention to provide a counting and dispensing system which uses cassettes which are not customized to a particular tablet or capsule.

It is a further object of the invention to provide a counting and dispensing system which uses cassettes which are relatively inexpensive to manufacture.

It is an additional object of the invention to provide a counting and dispensing system which is not subject to jamming by discrete objects being counted.

Another object of the invention is to provide a counting and dispensing system which provides rapid counting of the discrete objects.

A further object of the invention is to provide a counting and dispensing system which can also be used without a cassette.

An additional object of the invention to provide a counting and dispensing system which has the benefits of two different modes of operation, as a pour through counter, as well as a preset counter.

Yet a further object of the invention is to provide a counting and dispensing system which can also be used with a bowl feeder.

Yet another object of the invention is to provide a counting and dispensing system which is adapted for rapid exchange of cassettes and bowl feeders.

It is yet an additional object of the invention to provide a counting and dispensing system which functions with high reliability.

In accord with these objects, which will be discussed in detail below, an object counting and dispensing system is provided which includes a vibration system which substantially circularly vibrates in a horizontal circular plane, a mounting assembly for coupling a cassette to the vibration system, a chute configured to receive discrete objects from either the cassette or a funnel and dispense the objects to a patient bottle, and an object sensing system which senses and counts objects fed into the chute.

Each cassette includes a base and a stepped side wall which together define a central open reservoir portion and at least one substantially planar covered tray portion surrounding the reservoir portion. A lid is removably coupled over the reservoir portion. The reservoir portion is adapted to store tablets and feed the tablets through a path into the tray portion. The tray portion has a peripheral exit and guides the fed tablets toward the exit when the cassette is vibrated by the vibration system. The tray portion optionally includes a peripheral track which facilitates the guidance of tablets having non-flat surfaces toward the exit. A leaf spring gate closes the exit and is automatically opened by a permanent magnet attached to the tip of a solenoid when the cassette is attached to the mounting assembly, and closed when the cassette is removed therefrom. When the last tablet in a batch has been counted, the magnet is retracted and the leaf spring closes the exit of the cassette. The leaf spring also closes the cassette when the cassette is removed from the mounting assembly and moved away from the magnet. Each cassette includes a lower metal portion at which the cassette is mounted to the mounting assembly. Cassettes are mounted to the mounting assembly in a manner which permits rapid and secure coupling and decoupling. Preferred coupling means include an electromagnetic coupling system.

Each cassette is able to feed and guide a range of sizes and shapes of tablets toward the exit. As such, only a few standard sizes of cassettes are needed to accommodate a wide range of discrete objects for which the counter is primarily adapted: tablets, capsules, caplets, etc. When used with the cassette, the system functions as a preset counter wherein the counter is preset to count a desired number of tablets, and the counter then feeds and counts the exact number of tablets from the cassette.

Additional high capacity cassettes are also provided which include a base and a side wall which together define a reservoir portion, an exit from the reservoir, and a peripheral structure adapted to direct objects single file toward the exit.

As briefly discussed above, according to another aspect of the invention, the system can be used without the cassette and operate as a pour-through counter in which tablets are poured into the funnel.

In addition, a universal bowl feeder can be attached to the mounting assembly, preferably in the same manner as the cassettes. The bowl feeder can accommodate prescriptions which are not provided with their own cassette and for which it is desired to preset the number of tablets to be counted.

Additional objects and advantages of the invention will become apparent to the skilled in the art upon reference to the detailed description taken in conjunction with the provided figures.

BRIEF DESCRIPTION OF THE DRAWINGS

FIG. 7 is a perspective view of a cassette according to the invention with a lid enclosing the reservoir of the cassette;

FIG. 8 is a section view across line 8—8 in FIG. 7;

FIG. 9 is a perspective view of a cassette according to the invention without a lid enclosing the reservoir of the cassette;

FIG. 15 is a section view of a multi-tray cassette according to the invention;

FIG. 16 is a plan view of a bottom tray of the multi-tray cassette of FIG. 15;

FIG. 17 is a plan view of a top tray of the multi-tray cassette of FIG. 15;

FIG. 21 is a top perspective section view of yet another cassette according to the invention;

DETAILED DESCRIPTION OF THE PREFERRED EMBODIMENTS

Figure 1:
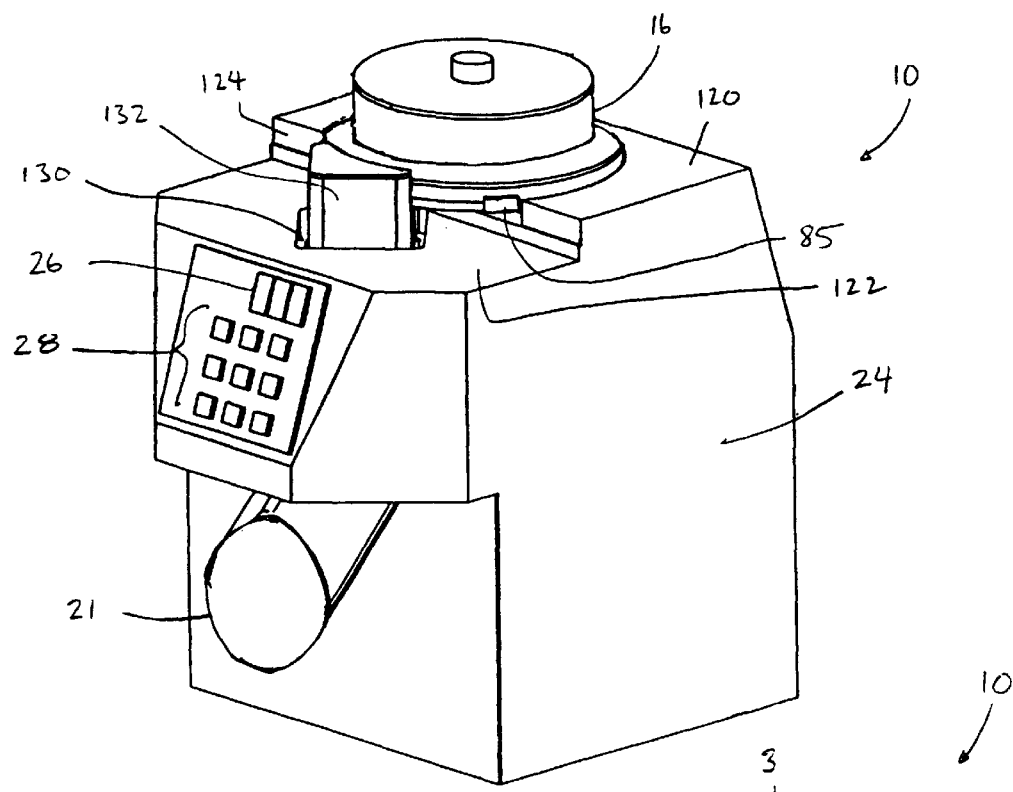
FIG. 1 is a perspective view of a system for feeding, counting, and dispensing discrete objects according to the invention, shown with a cassette attached thereto.

Turning now to FIGS. 1 through 5, according to a preferred embodiment of the invention, an object counting, feeding, and dispensing system 10 includes a vibration system 12 which substantially circularly vibrates in a horizontal plane, a mounting assembly 14, described in detail below, which secures a cassette 16 to the vibration system in a manner in which the cassette may be rapidly removed such that another cassette can be rapidly secured to the mounting assembly, a chute 18 oriented to receive discrete objects from a cassette 16 and feed the objects to a bottle or container located at an exit spout 21 beneath the chute, and an object counting system 22 which through windows 23a, 23b senses and counts objects passing within the chute 18. Hereinafter, the term 'tablets' is used interchangeably with 'objects', unless the context dictates otherwise.

Figure 6:
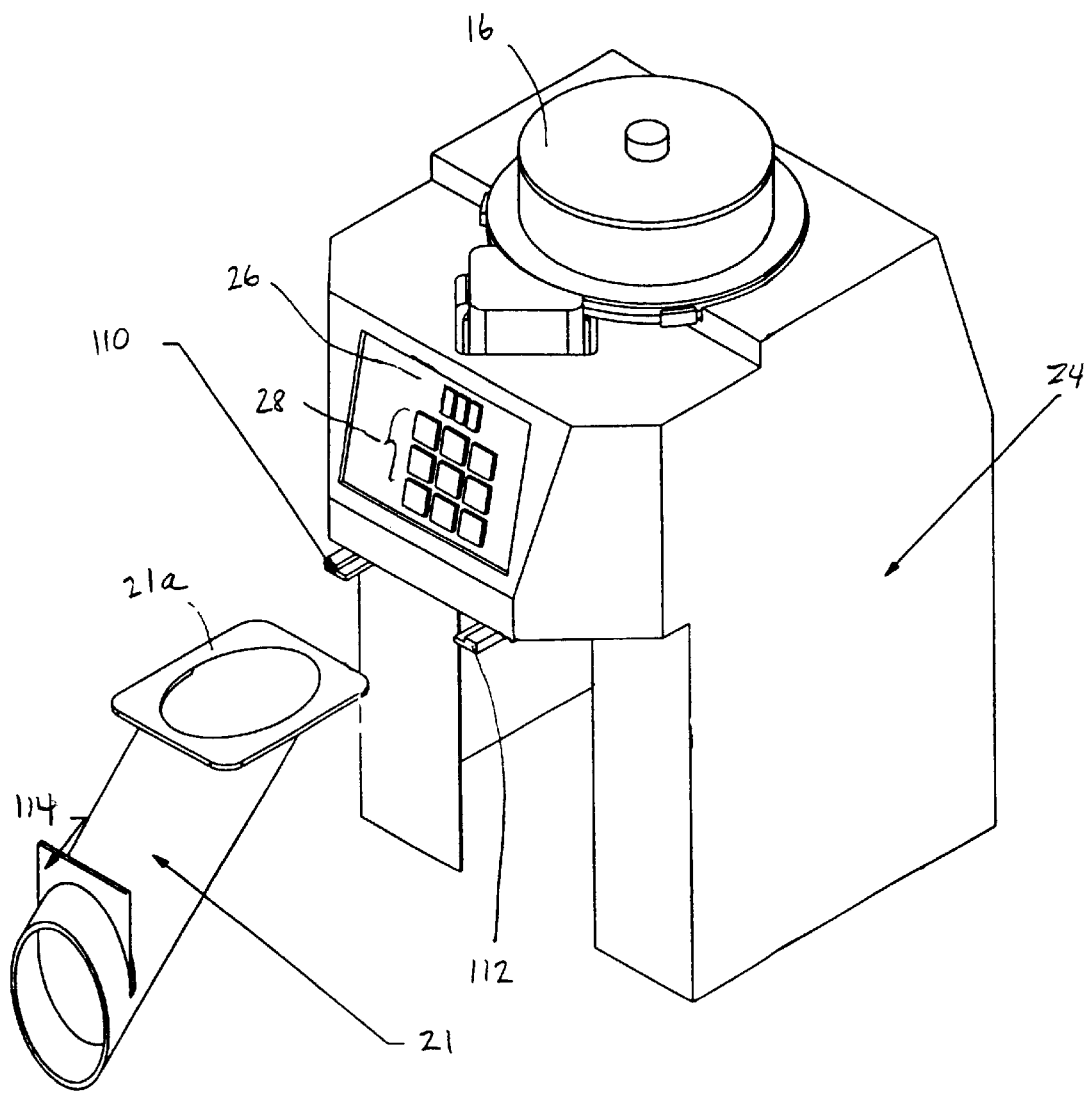
FIG. 6 is an exploded perspective view showing the spout removed from the housing of the system according to the invention.
Figure 10:
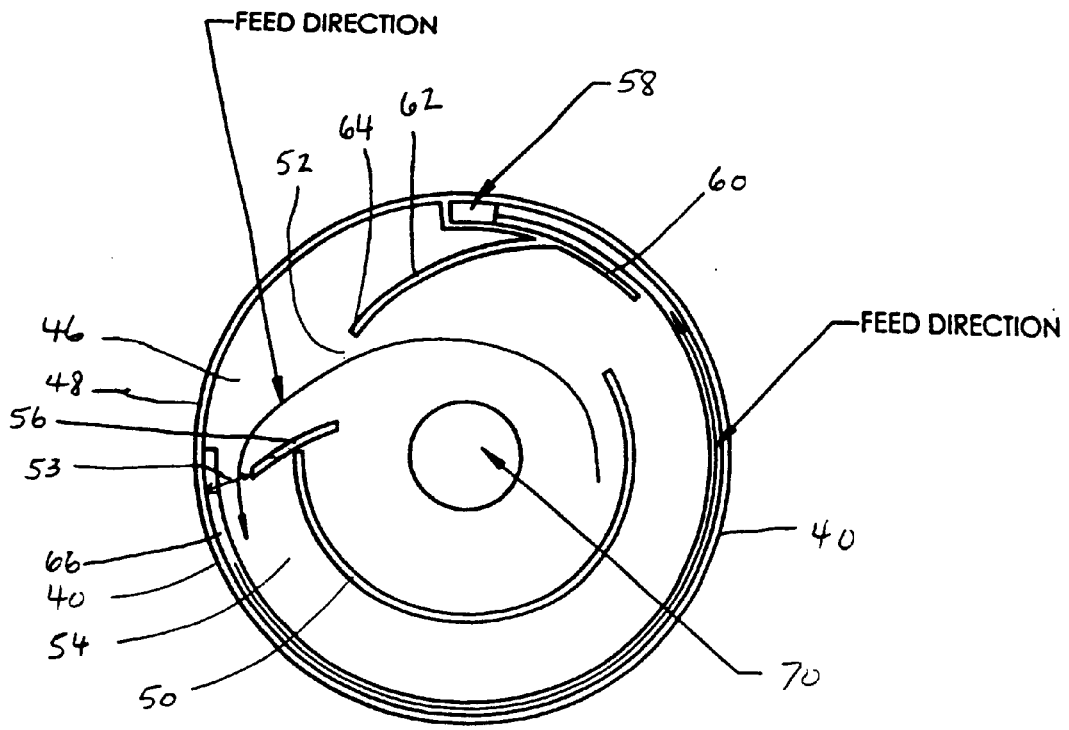
FIG. 10 is a plan view of a base portion of the cassette according to the invention.

The vibration system 12, mounting assembly 14, chute 18, and object counting system 22 are provided in a housing 24. The housing 24 is provided with a user display 26, and an input panel 28, as well as a microprocessor 30. The display 26 indicates the number of tablets counted, and is coupled via the microprocessor 30 to the object counting system 22. The input panel 28 permits the user to input a number of tablets which the system is to feed, count and dispense to a bottle. A power supply 34 is electrically coupled to the vibration system 12, the mounting assembly 14, the object counting system 22, the display 26 and input panel 28, and the microprocessor 30. The object counting system 22 is preferably an optical system which uses an optical sensor array, such as that disclosed in co-owned U.S. Pat. No. 5,768,327, which is hereby incorporated by reference herein in its entirety. The optical sensor array of U.S. Pat. No. 5,768,327 includes an orthogonal arrangement of two discrete optical sensors which together sense objects in three dimensions. This sensor arrangement is adapted to sense multiple objects simultaneously falling passed the sensors. Alternatively, the counting system may include any other counter for counting discrete objects which is known in the art. As shown in FIG. 6, the spout 21 includes an upper lip 21a at which the spout is preferably removably mounted on two slides 110, 112 which holds the spout beneath the chute, but permits removal. The spout is also preferably provided with a gate 114 which prevents dispensing from the spout until lifted, thereby preventing the tablets from spilling from the spout until the user is prepared with a bottle at the exit spout. The spout 21 may be slidably removed from the slides 110, 112 for cleaning. In addition, the spout can be removed for transfer of the contents of the spout to another location (with the gate in the closed position), and then inverted to pour the spout contents from the lip end of the spout.

Figure 2:
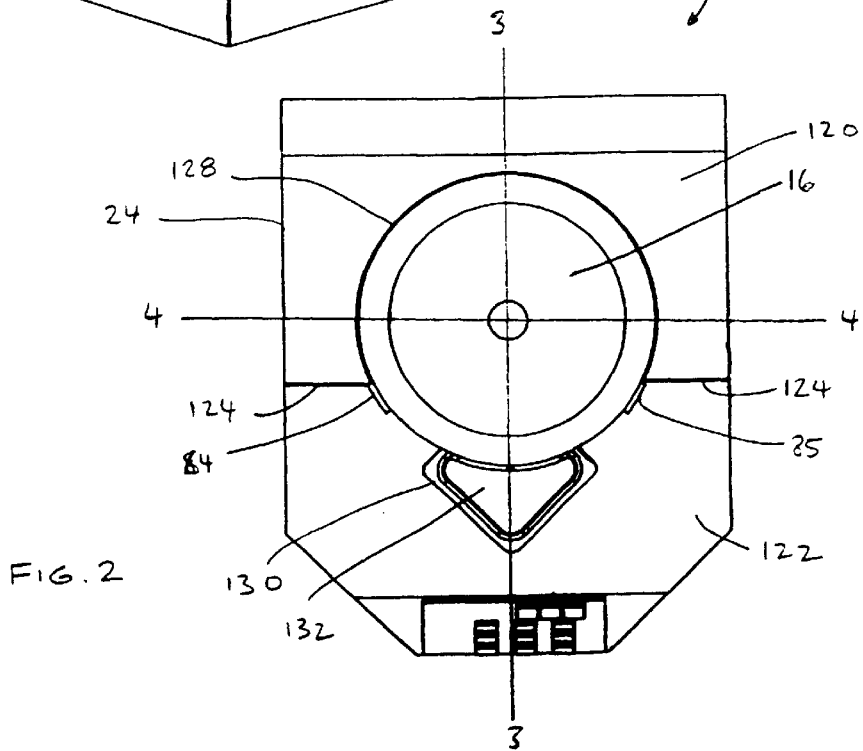
FIG. 2 is a plan view of the system for feeding, counting, and dispensing objects according to the invention, shown with a cassette attached thereto.
Figure 26:
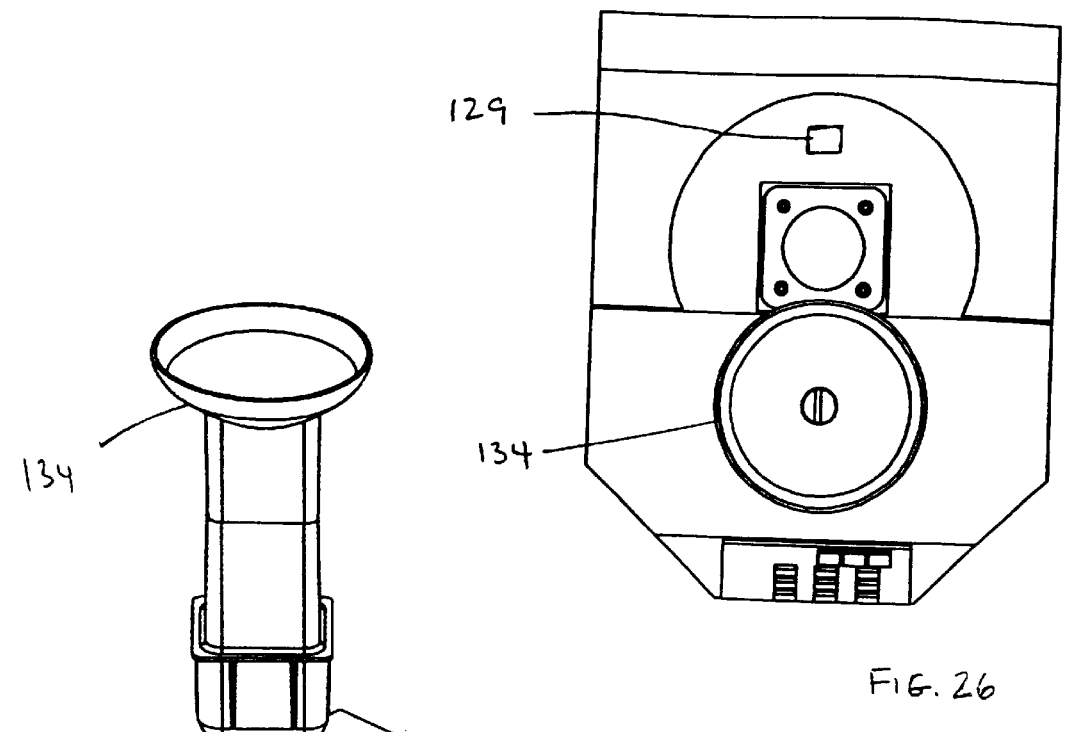
FIG. 26 is a plan view of the system for feeding, counting, and dispensing objects according to the invention, shown with a funnel attached in alignment with the chute.
Figure 25:
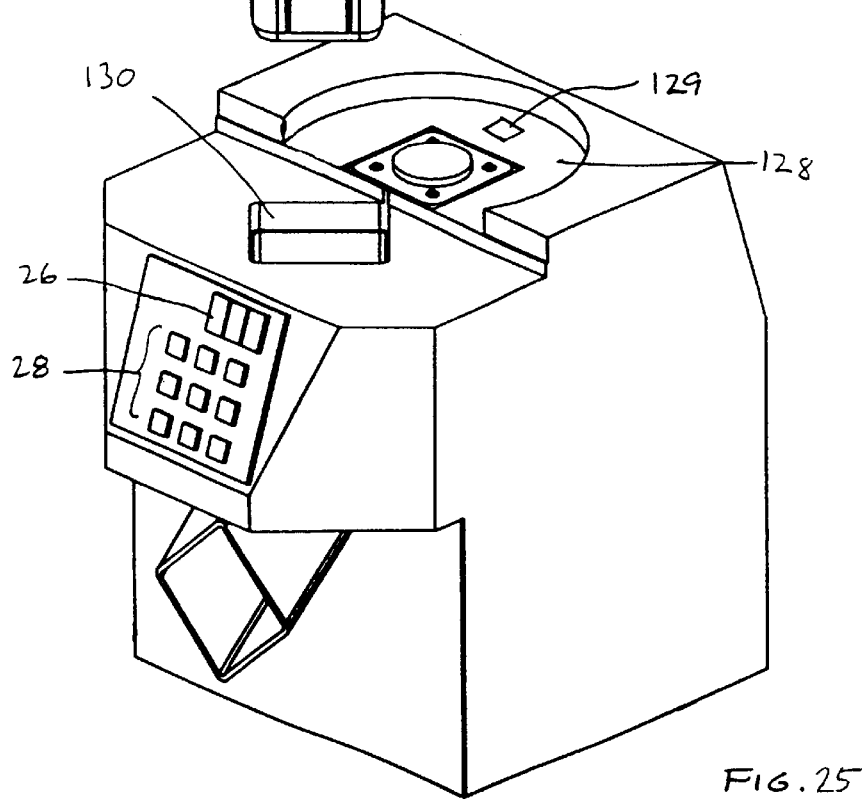
FIG. 25 is an exploded perspective view of the system for feeding, counting, and dispensing discrete objects according to the invention, shown with a funnel adapted to be provided in alignment with the chute of the system.

Referring to FIGS. 1 and 2, the top of the housing 24 preferably includes an upper deck 120, a lower deck 122, and a generally vertical wall 124 at the junction thereof. The upper deck 120 includes a circular-portion recess 128 which extends through the wall 124 and which is sized and shaped to receive a preferably substantial portion of a cassette 16. The recess 128 is preferably approximately 270° in curvature. The mounting assembly 14 is accessible at the recess 128. The recess 128 also includes a sensor 129 (FIGS. 25 and 26) which senses when a cassette is positioned in the recess. The chute 18 has an entrance 130 on the lower deck 122 which is preferably provided with a shield 132 which partially covers the entrance of the chute. The shield 132 has several functions: it functions as a light shield to prevent stray light from interfering with the optical sensory array of the object counting system 22, it functions as a object shield to prevent stray objects from falling into the chute and being counted, and it may function as a placement guide to facilitate the rapid placement of a cassette on the mounting assembly 14. While the shield 132 is preferably a discrete element which may be positioned in the chute, it may alternatively be formed as part of the cassette to provide some or all the same functionality. As such, when the cassette is provided on the mounting assembly, the shield initially would function as a guide to facilitate the placement of a cassette on the mounting assembly, and then shield stray light from the optical sensory array and prevent stray objects from falling into the chute.

Turning now to FIGS. 7 through 10, each cassette 16 includes a relatively thin preferably plastic base 40 and a preferably plastic top element comprised of a wall 42 and an annular shelf 43 fixedly coupled to the base such that the base and top element together define a central reservoir portion 44 and a peripheral covered tray portion 46. The base 40 preferably includes a peripheral wall 48, and a reservoir wall 50 concentric with the peripheral wall and having an opening 52. An entry guide 56 is obliquely angled relative to the reservoir wall 50 at the opening 52 and defines a narrow 53 between the end of the entry guide and the peripheral wall which serves as an entry to track area 54. The base 40 also includes an exit hole 58 adjacent the peripheral wall 48 substantially 270° counterclockwise relative to the entry guide 56, and an exit guide 60 located relative to the peripheral wall 48 such that tablets traveling between the peripheral wall 48 and the exit guide 60 are directed in a single file to the exit hole 58. The base 40 preferably includes a return guide 62 which facilitates movement of tablets which have not entered the exit guide 60 in the counterclockwise direction back toward the entry guide.

In the preferred embodiment, the opening 52 is defined between the entry guide 56 and a free end 64 of the return guide 62. Optionally, a shallow concavely curved or sloped channel 66 having a width for guiding a single tablet or capsule is formed in the base 40 adjacent a portion of the peripheral wall 48 from the location of the entry guide 60 counterclockwise to the exit hole 58. The width of channel is preferably between 0.5–1.5 times the width of the range of tablets or capsules for which the cassette is designed. The base 40 preferably also includes a central circular hole 68, and a metal plate 70 on the base over the hole 68 (FIGS. 8 and 9). The plate 70 includes a hole 71, and a post 72 is coupled in the hole 71 and extends vertically upwards therefrom. The upper end 74 of the post is threaded. A lid 76 including a central hole 78 is provided on the top element 42 such that the upper end 74 of the post extends through the hole 78. A knob 80 is threaded onto the post in order to secure the lid 76 on the top element 42 and to enclose the reservoir 44 (FIGS. 7 and 8).

Preferably the height of each of the peripheral wall 48, the reservoir wall 50, and the guides 56, 60 and 62 is the same, height H (FIG. 8). The shelf 43 rests on the walls 48 and 50 and guides 56, 60 and 62 to substantially enclose the tray portion 46 to provide the tray portion with a height H. The height H is preferably substantially 1.2 to 1.8 times the height of a tablet (across the diameter of cylindrical capsules and caplets, or transverse to the flattest surface of a tablet) which is to be stored in and fed from the cassette. In addition, the opening 52 is preferably approximately three to eight tablets in size (across the diameter of cylindrical capsules and caplets or the flattest surface of a tablet). Furthermore, the narrows 53 is preferably approximately two to four tablets in size (across the diameter of cylindrical capsules and caplets or the flattest surface of a tablet). As such, a single cassette is adapted to feed and guide a range of sizes and shapes of discrete objects toward the exit. Only a few standard cassettes sizes are thereby needed to accommodate all discrete objects for which the counter is primarily adapted: tablets, capsules, caplets, etc. In addition, the manufacture of the cassettes is relatively inexpensive, as the primary material of manufacture is plastic, and the cassette for an individual prescription does not need to be custom manufactured.

Figure 5:
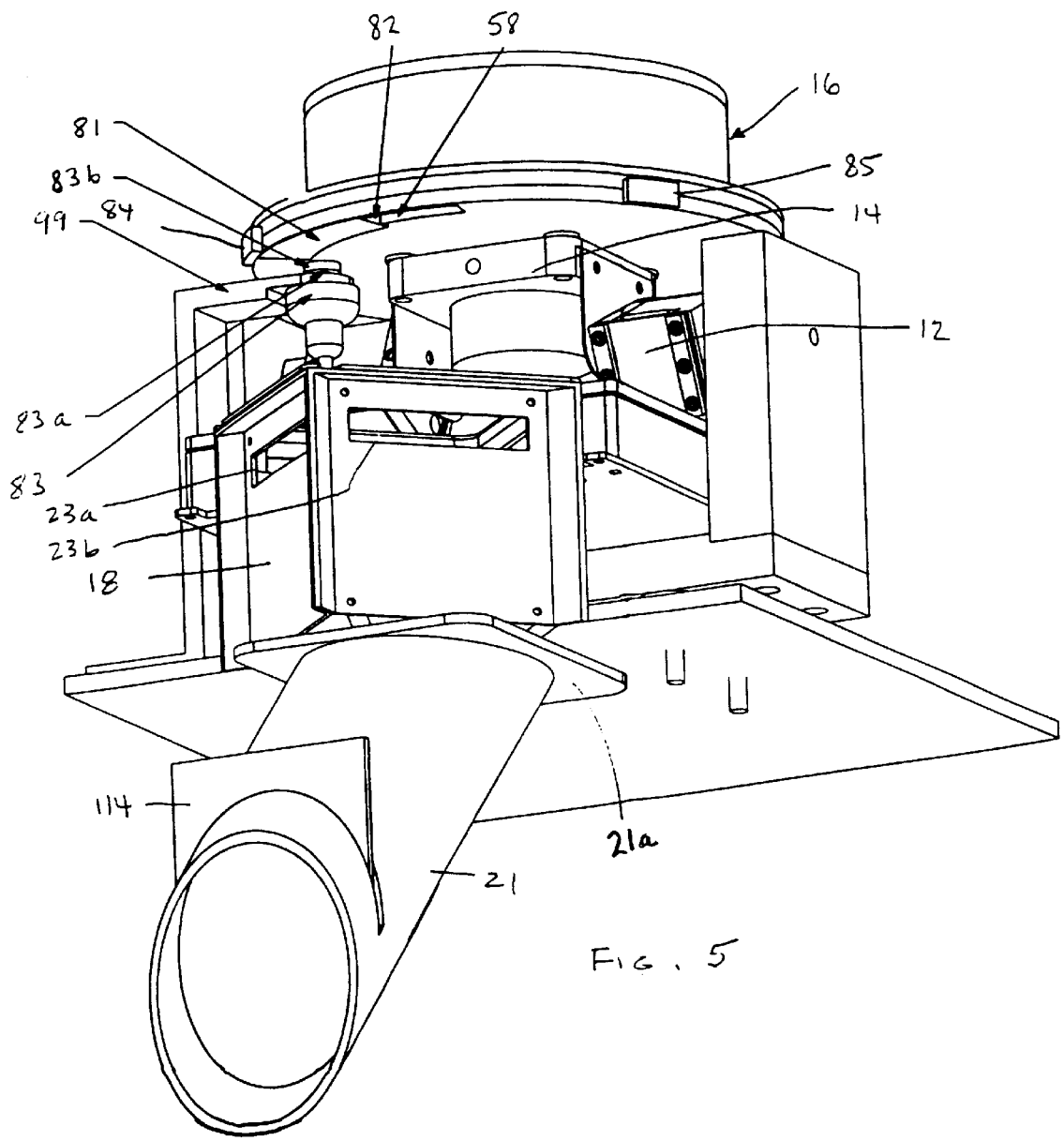
FIG. 5 is a perspective view of the assembly of a vibration system, a mounting assembly, a chute and a spout, and an object sensing system, and a cassette attached to the mounting assembly, the cassette having a gate in an open position.
Figure 11:
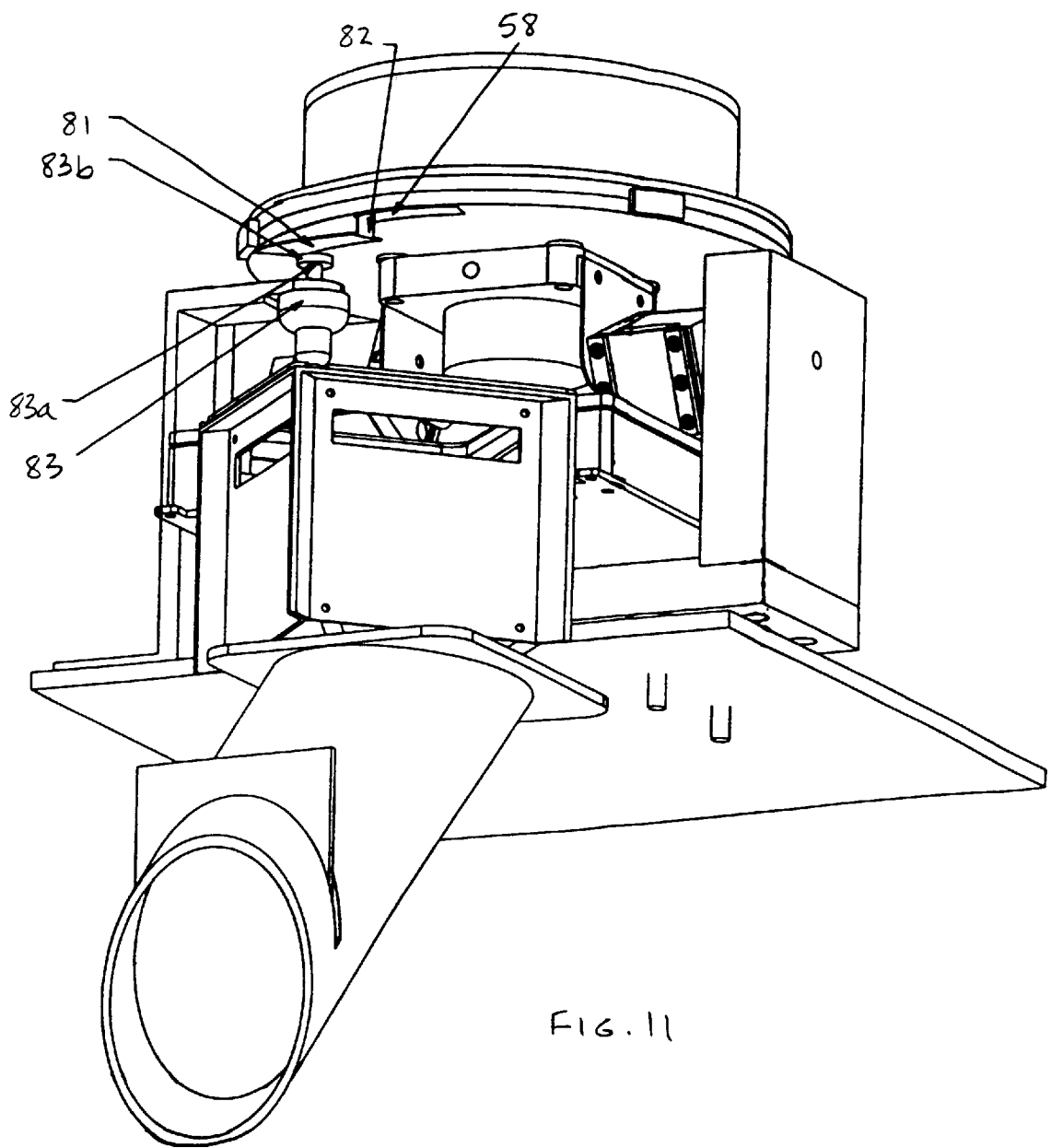
FIG. 11 is a perspective view of the assembly of a vibration system, a mounting assembly, a chute and a spout, and an object sensing system, and a cassette attached to the mounting assembly, the cassette having a gate in an open position.

Referring back to FIG. 5, the cassette 16 is provided with a metal leaf spring 81 having an upturned gate portion 82 extending into and blocking the exit hole 58 of the cassette. A means, e.g., a solenoid 83, is provided in the housing for automatically opening the gate and permitting the tablets to exit the exit hole 58 of the cassette 16. The solenoid 83 is mounted on a mounting bracket 99 and has a shaft 83a extending thereabove. The solenoid shaft 83a preferably does not contact the gate to open the gate. Rather, a magnet 83b is provided at the end of the shaft 83a. When the solenoid 83 is actuated, the magnet 83b is moved closer to the leaf spring 81 causing the leaf spring to deflect toward the magnet 83b and pull the gate portion 82 from the exit hole 58 to permit the release of tablets in the cassette (FIG. 11). Deactivation of the solenoid 83 moves the magnet 83b further from the leaf spring 81 such that the bias of the leaf spring overcomes the force of the magnet 83b, and the exit hole 58 is again closed by the gate portion 82 (FIG. 5). Other magnetic, mechanical or electromechanical elements or assemblies may alternatively be used to close and open the exit hole of the cassette.

Referring to FIGS. 1 through 3 and 5, the cassette 16 preferably also includes two alignment posts 84, 85. The posts 84, 85 are preferably equally spaced apart about the exit hole 58. The posts 84, 85 are preferably nondiametrically located, and most preferably separated by approximately 120°. The posts are spaced to align the cassette with the wall 124 on the housing (but preferably not contact the wall) when the cassette 16 is placed on the upper deck 120 (FIGS. 1 and 2). This ensures alignment of the exit hole 58 over the chute entrance 130.

Figure 12:
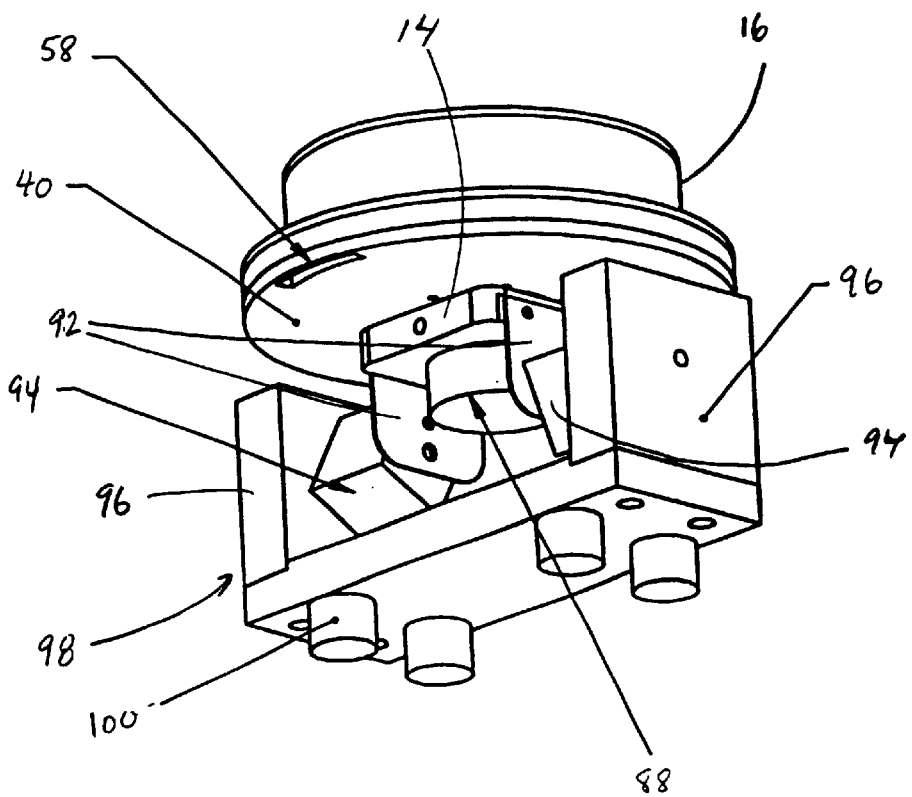
FIG. 12 is a bottom perspective view of the mounting system and the vibration system, the mounting system shown with a cassette coupled thereto.
Figure 13:
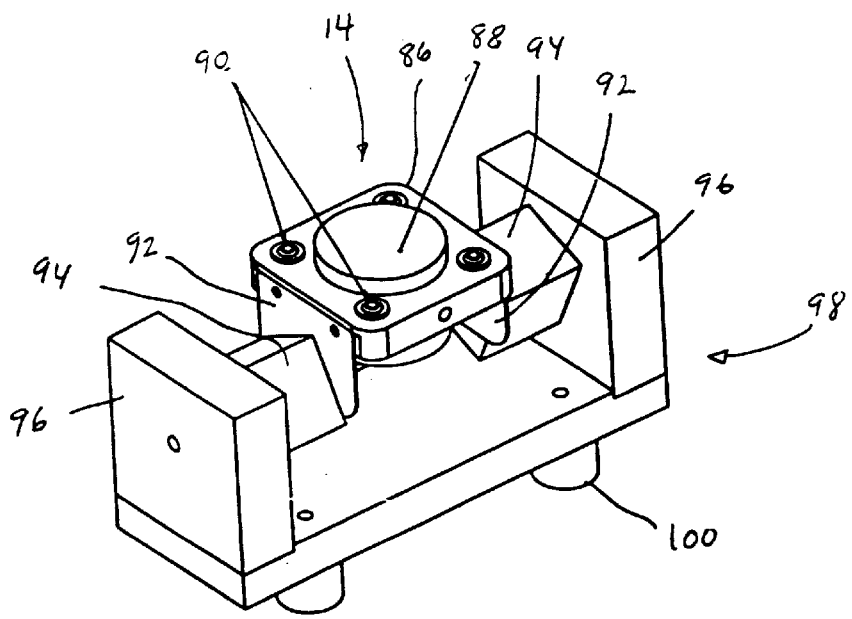
FIG. 13 is a top perspective view of the mounting system and the vibration system.

Cassettes 16 are mounted to the mounting assembly 14 in a manner which permits rapid and secure coupling and decoupling. Preferred coupling means include electromagnetic coupling and power-driven clamping systems. Referring to FIGS. 12 and 13, with respect to an electromagnetic coupling, the mounting assembly 14 includes a base 86 provided with a preferably cylindrical electromagnet 88 sized to fit snugly at least partially within the hole 68 in the bottom of the cassette and provided adjacent the metal plate 70. The cassette 16 is provided over the electromagnet 88, and the electromagnet is activated to cause a secure coupling of the cassette thereto. Conversely, deactivation of the electromagnet permits rapid decoupling of the cassette from the mounting assembly. The base 86 preferably includes a plurality of resilient ball plungers 90 adapted to force the bottom of the cassette 16 from its snug fitting over the electromagnet 88 when the electromagnetic is deactivated. The base 86 is also coupled to two brackets 92 on opposite sides of the base adapted to couple the base to the vibration system 12.

Still referring to FIGS. 12 and 13, the vibration system 12 includes two shaker elements (electromechanical vibrators known in the art) 94 which are coupled to opposite side walls 96 of a rigid U-shaped block 98. In turn, the brackets 92 of the mounting assembly 14 are coupled between the shaker elements 94. The shaker elements 94 are adapted to provide a horizontal circular vibratory motion in the feed direction (FIG. 10) to the mounting assembly and consequently to a cassette rigidly mounted on the mounting assembly. The inertial block 98 is coupled by rubber shock mounts 100 to a support 102 within the housing. The shock mounts 100 substantially prevent vibratory energy from being transferred to the housing 24.

Figure 3:
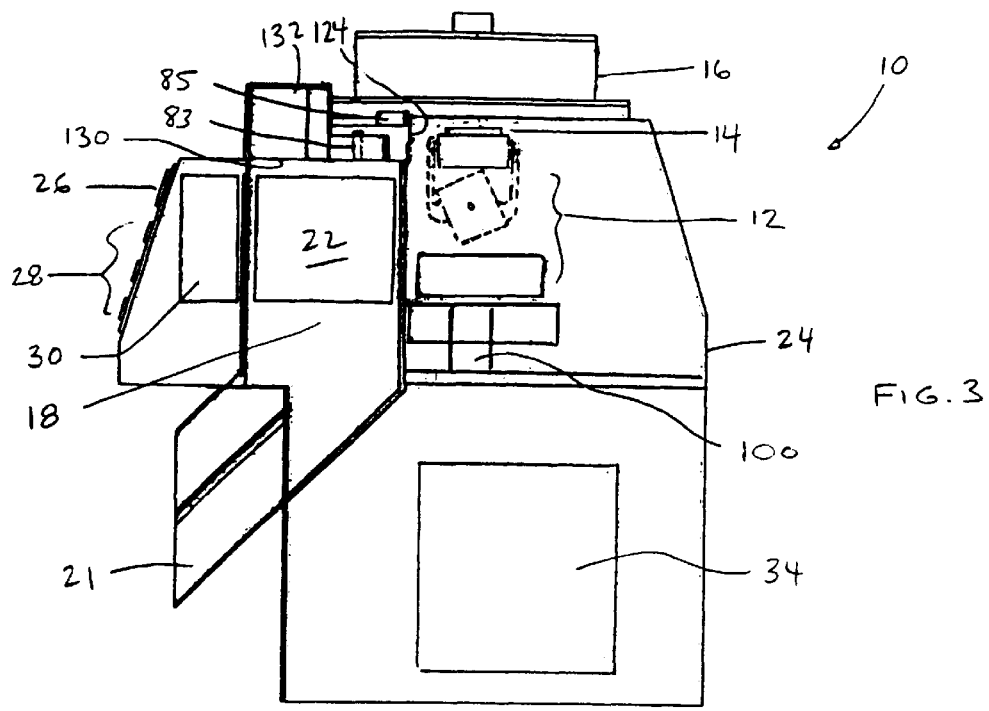
FIG. 3 is a section view across line 3—3 in FIG. 2.
Figure 14:
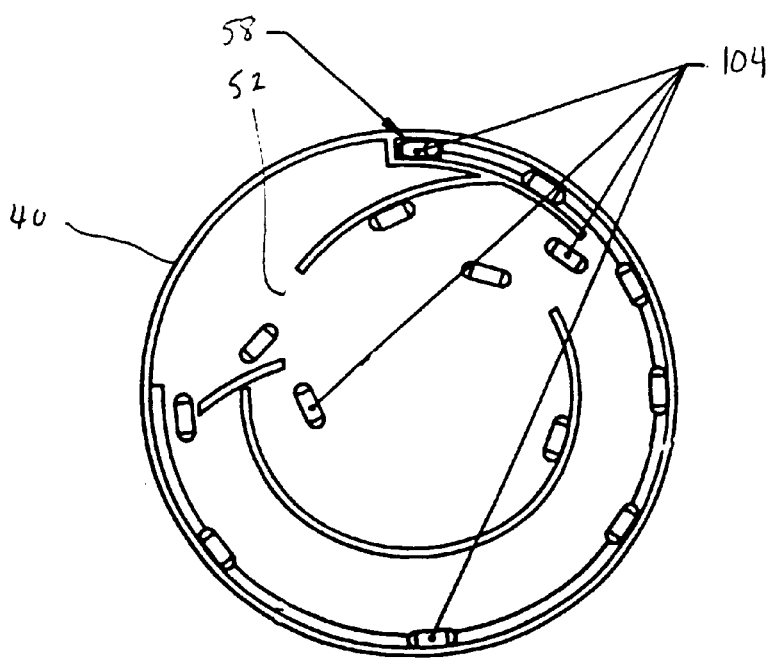
FIG. 14 is a plan view of the base portion of the cassette provided with capsules and illustrating the movement of capsules thereon.

In use, the reservoirs of a plurality of cassettes in a pharmacy setting are each provided with the tablets of a different prescription medicine. If it is then desired to count a fixed or predetermined number (e.g., one hundred) of capsules 104 of a particular prescription into a bottle, the cassette 16 containing the particular prescription is provided on the mounting assembly 14 of the system. This is particularly done by providing the cassette in the recess 128 in an orientation in which the alignment posts align the cassette with the edges of the wall 124. The desired number of capsules to be counted is then entered via the keypad 28, a patient prescription bottle is placed adjacent exit spout 21, and a start button on the keypad is activated. Operation of the start button (1) provides electricity to the electromagnet 88 to temporarily secure the cassette 16 thereon, (2) activates the solenoid 83 to open the gate portion 82 of the leaf spring 81 on the cassette, and (3) operates the vibration system 12 to initiate vibration of the cassette. Referring to FIGS. 3, 8, 10 and 14, when the cassette 16 is vibrated by the vibration system 12, capsules 104 in the reservoir 44 of the cassette are moved in the counterclockwise feed direction through the opening 52 and the narrow 53 (it being appreciated that for purposes of clarity far fewer capsules than typically present are shown). The height H of the opening 52 and size of the narrow 53 limits too many capsule from entering the track area 54 at one time as the opening height basically guarantees that the capsule will not exit the reservoir in a stacked configuration while the narrow limits the number of capsules simultaneously entering the track area. Referring to FIG. 14, the vibration urges capsules which have passed through the narrow 53 and into the track area 54 to move toward the peripheral wall 48 and into the channel 66. Generally, the capsules are provided in a quantity to substantially fill the reservoir 44 and crowd the track area 54. The channel 66 is sized to receive the capsules 104 in a lengthwise orientation. The capsules 104 continue in the channel 66 in a counterclockwise movement through the exit guide 60 and are directed single file toward the exit 58. The capsules fall through the exit 58, enter the chute 18, are each counted by the object counting system 22, and are dispensed at the spout 21 into a bottle (FIGS. 1 and 3). Capsules 104 which do not exit the cassette 16 during a first pass around the track area 54 are guided back toward the narrow by the return guide 62. The capsules 104 continue traveling around the track area 54 and through the exit 58 until the selected number of capsules is counted, as indicated by the display 26. Once the system has counted the required number of capsules, the vibration stops, the solenoid releases the gate, and the cassette is released from the mounting assembly. With this system, objects can be fed and counted relatively rapidly, typically from five to twenty per second.

According to a preferred aspect of the invention, when the system has counted to near the required number, the vibration system vibrates at a lower amplitude to slow down the rate of counting. This feature substantially prevents overcounts which may occur due to having counted the required number of capsules even though uncounted capsules still exist in the space between the exit hole 58 and the counting system 22. A slow down system is described in detail in co-owned U.S. Pat. No. 5,473,703, which is hereby incorporated by reference herein in its entirety.

A cassette can easily and rapidly be removed from the system by removing the power to the electromagnet 88. The ball plungers 90 then push the cassette from over the electromagnet to facilitate manual removal of the cassette from the mounting assembly. A second cassette may then be placed over the electromagnet and power can then be resupplied to the electromagnet to provide a very secure coupling with the second cassette.

It is noted that in cassette 16, all tablets must travel in single file through exit hole 58. As such, one limitation of the cassette system is the speed at which tablets or other single dose medications can be fed and exited into the chute for counting. In view thereof, a second embodiment of a cassette adapted to feed tablets more rapidly and yield greater system throughput is provided. Turning now to FIGS. 15, 16 and 17, the second embodiment of the cassette 216 generally includes a reservoir 244 which feeds tablets and other single dose medication to two discrete trays (levels) 254, 255. Each tray is provided with an exit hole 258, 259 which feeds the tablets into the chute 18 of the system 10. More particularly, the cassette 216 includes a base 240 having an upper surface defining the first tray 254, an intermediate shelf 241 having an upper surface defining the second tray 255, an annular cover over the shelf 243, and a cylindrical element 242 over the cover and which defines the reservoir portion 244. The base 240, as shown in FIG. 16, is substantially similar to base 40 with the following exception: a second hole 281, preferably walled-off from exit hole 258 and the remainder of the first tray 254, is provided preferably adjacent exit hole 258. The second hole 281 is provided along the periphery of the tray and located counterclockwise from the exit hole 258. Referring to FIG. 17, the shelf 241 is also substantially similar to base 40 with the following exceptions. First, exit hole 259 is aligned over the second hole 281 on the first tray 254. Second, the shelf includes a relatively large central opening 283 adapted to permit tablets in the reservoir 244 to pass therethrough and onto the first tray 254.

When tablets are provided into the reservoir, they naturally stack substantially in the formation shown in broken lines in FIG. 15. As the cassette is vibrated, tablets move from the stack onto the tray and shelf, and peripherally to the tracks 254, 255. From the tracks, the tablets are fed toward the exit holes 258, 259. Tablets exiting exit hole 258 fall directly into the entrance 130 of the chute 18. Tablets exiting exit hole 259 fall through hole 281 in the first tray and then into the chute 18. In order to close the exit holes, two leaf spring gates 291, 293 are used. Opening of the spring gates may be actuated by two solenoids provided in the housing 24, each being to adapted to separately open one of the gates. Alternatively, a single solenoid configured to open both gates, e.g., having two arm portions coupled thereto, may be used to operate both gates. Where two solenoids are used, it may be preferable to have one of the solenoids operate to release and close one of the gates when the number of counted tablets approaches the number desired, leaving only one of the gates open. This prevents two tablets from substantially simultaneously falling into the chute (one from each exit hole) when only one additional tablet is needed for a full count.

As stated above, the dual sensor array of previously incorporated U.S. Pat. No. 5,768,327 is adapted to sense multiple objects simultaneously falling passed the sensors. As such, it is ideally suited to sense tablets exiting from the two-level cassette.

Figure 18:
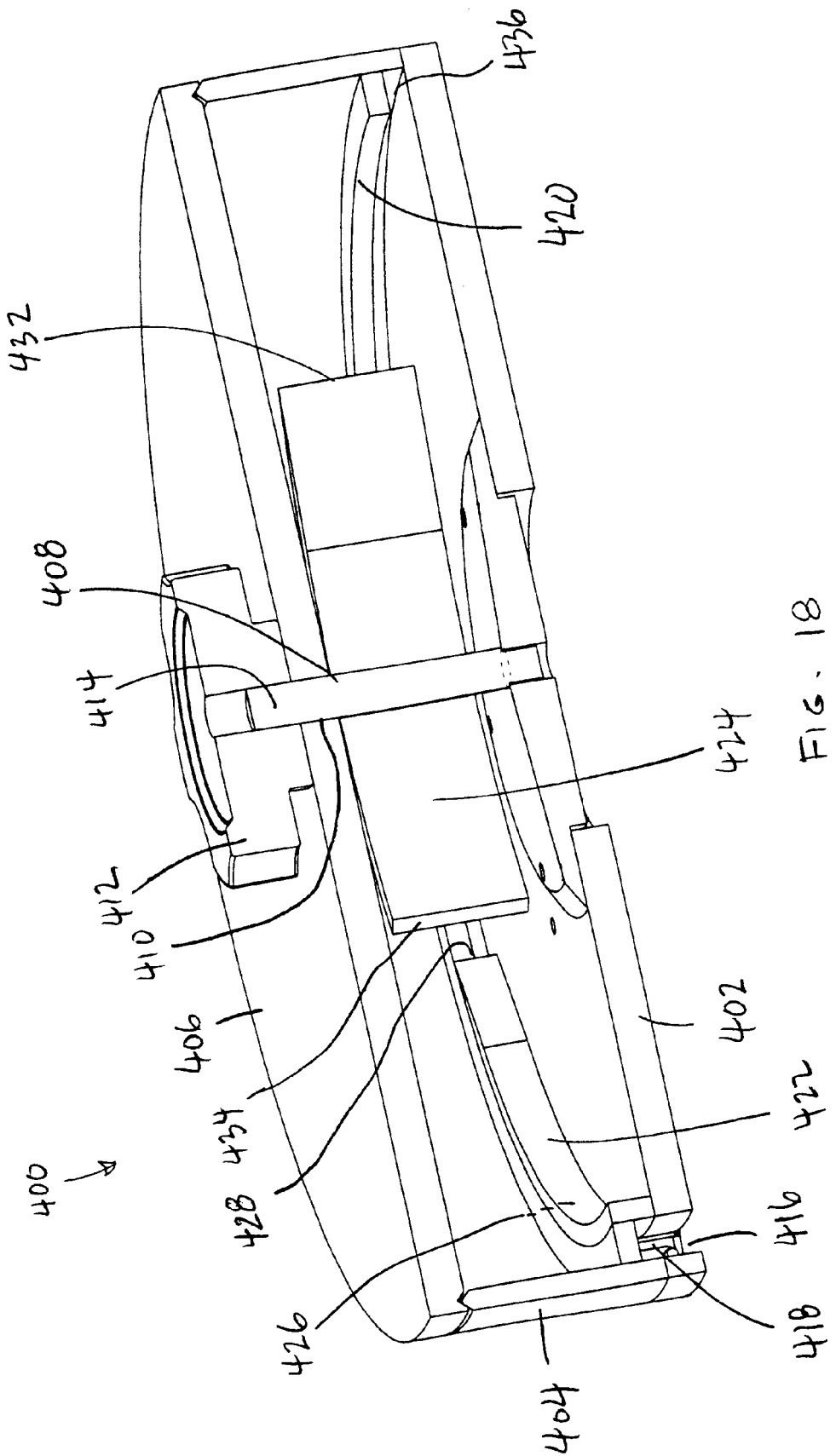
FIG. 18 is a perspective section view of another cassette according to the invention.
Figure 20:
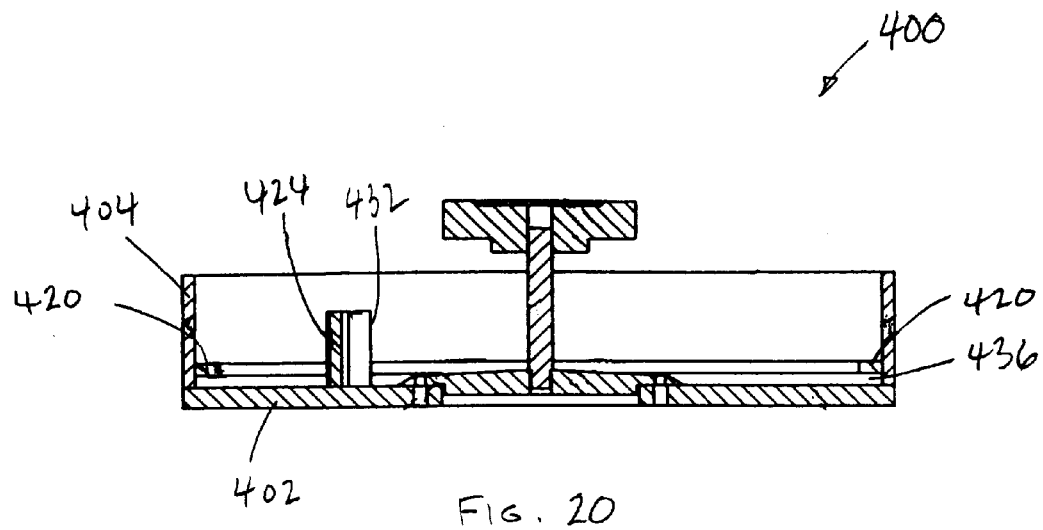
FIG. 20 is a section view across line 20—20 in FIG. 19.
Figure 19:
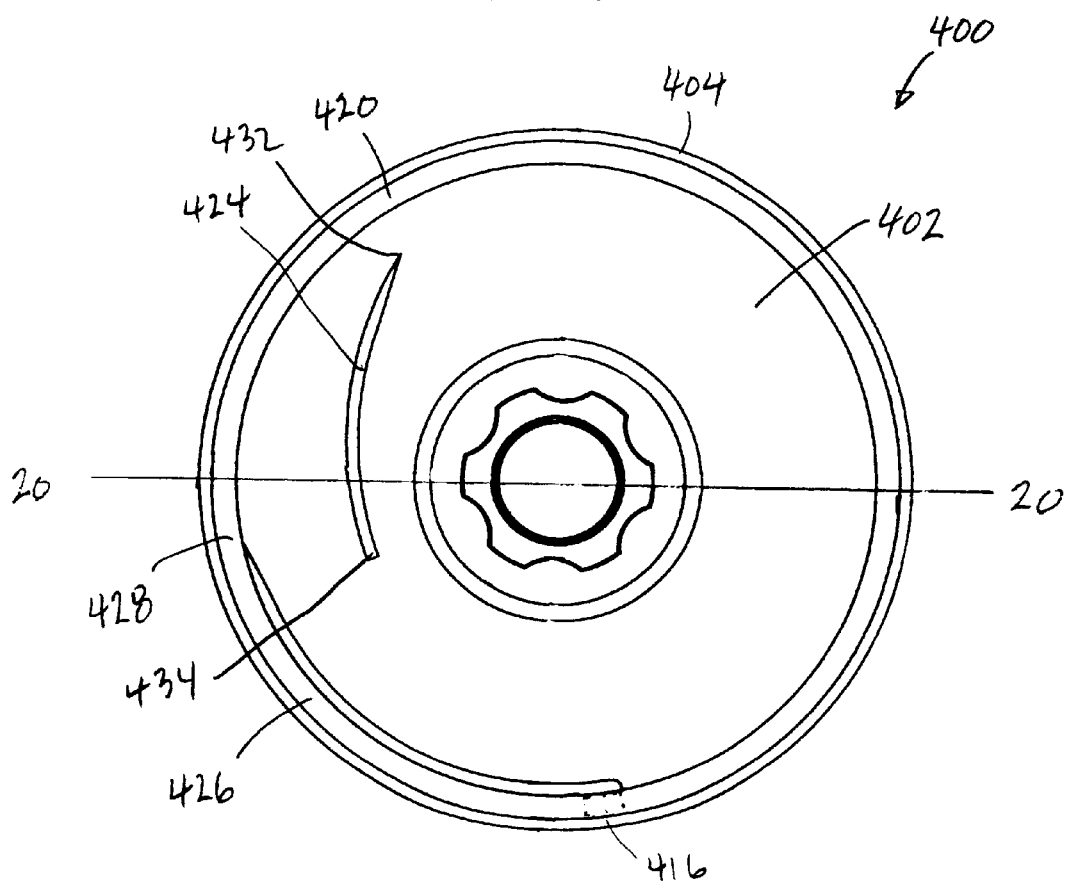
FIG. 19 is a plan view of the cassette of FIG. 18.
Figure 22:
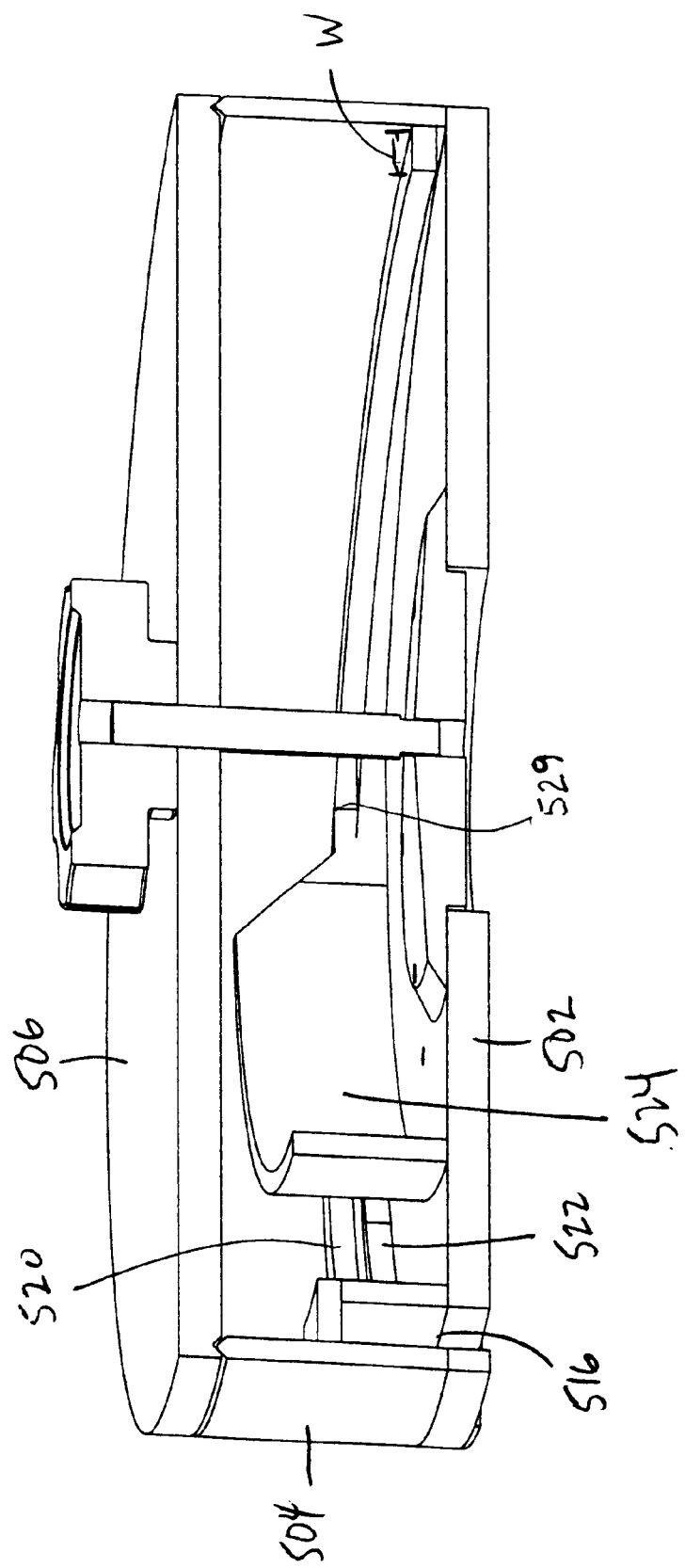
FIG. 22 is a perspective section view of the cassette of FIG. 21.
Figure 24:
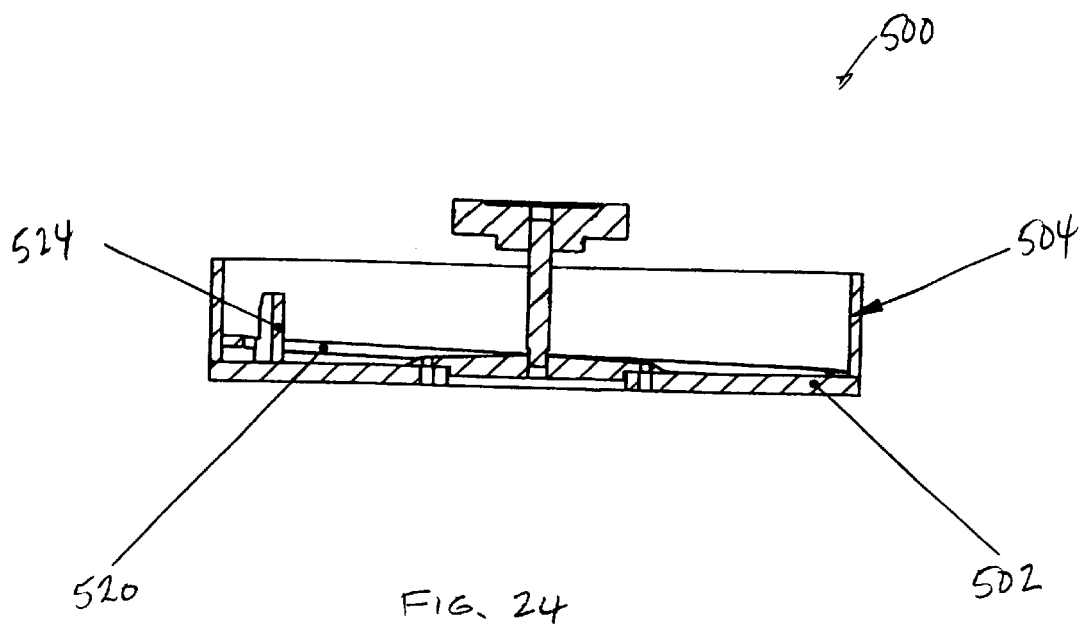
FIG. 24 is a section view across line 24—24 in FIG. 23.
Figure 23:
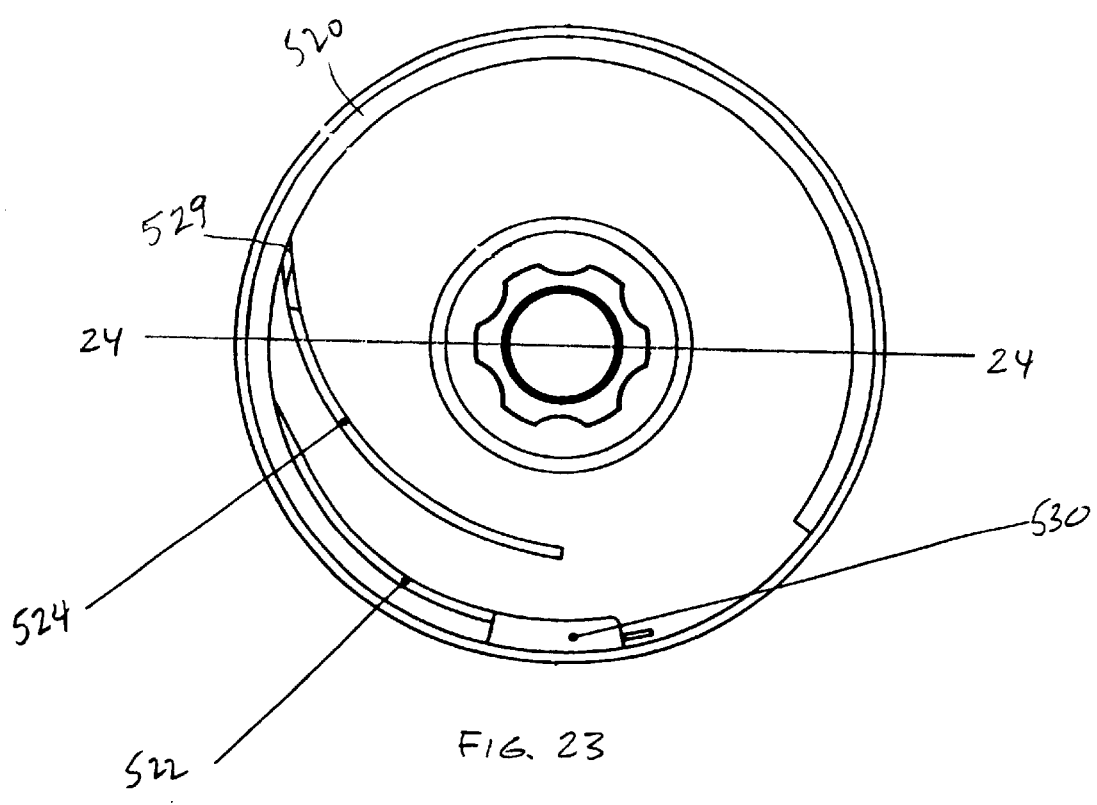
FIG. 23 is a plan view of the cassette of FIG. 21.

A relatively larger storage capacity is also needed for certain high volume medications dispensed, e.g., by a mail order pharmacy dealing with high prescription volumes. A greater capacity is desired in order to limit the number of times the cassette must be removed for refill. Turning now to FIGS. 18 through 20, a first relatively higher capacity cassette 400, preferably for use with tablets, is shown. The cassette 400 includes a base 402, a circumferential side wall 404, and a lid 406. As discussed with previous embodiments, the base 402 is provided with an upstanding threaded stud 408, and the lid 406 includes a hole 410 which is positioned over the top of the stud 408. A nut 412 may be thread over the exposed portion 414 of the stud 408 to secure the lid 406 against the wall 404. The base 402, as also discussed with previous embodiments, includes an exit hole 416 and a releasable gate 418.

According to this embodiment, no large shelf (such as annular shelf 43), which limits the capacity of the cassette, is included in the cassette. Rather, the wall 404 is provided with a preferably annular top guide (a lip) 420 about its inside periphery. The annular top guide 420 is positioned preferably more than a height of a tablet above the base 402, but less than twice the height of a tablet, and preferably 1.2–1.8 times the height of tablet. The top guide 420 has a width of less than twice the diameter of a tablet, and preferably less than 1.5 times the diameter. The height of a tablet is defined as the dimension transverse to the flattest surface of a tablet, while the diameter is the largest dimension, whether or not the tablet is round. The area under the top guide 420 defines a channel 436 which is substantially open along its internal periphery, with the exception of the location leading up to exit hole 416 (extending from a location clockwise of the exit hole 416 toward the exit hole in cassettes adapted to be vibrated in a counterclockwise direction) which is enclosed by a barrier wall 422 such that a tunnel 426 leading to the exit hole is formed with an entrance 428. A tablet guide 424 is provided on the base 402 clockwise of the barrier wall 422. The tablet guide 424, having a height substantially greater than height of the top guide 420, and preferably more than half the height of the wall 404, is configured to direct a majority of tablets that are not located under the top guide 420 away from the location at which the annular guide wall starts; i.e., the counterclockwise-most position of the barrier wall 422. The tablet guide 424 has a preferably tapered leading edge 432 provided circumferentially before the entrance 428 to the tunnel 426 and a terminal edge 434 terminating circumferentially after the entrance 428.

In use, the cassette 400 is filled with tablets. When the cassette is vibrated counterclockwise, some of the tablets move around the wall under the top guide 420 and toward the exit hole 416. As the tablets move around the base, the guide wall 424 directs some tablets away from the entrance 428 of the tunnel 426 to prevent tablet jamming at the entrance. The tunnel 426 forces the tablets entering therein to be in a single file formation, without tablets stacking one on top of another which could otherwise jam the exit hole 416.

Turning now to FIGS. 21 through 24, a second relatively higher capacity cassette 500, preferably for use with capsules and caplets (hereinafter, collectively 'capsules'), is shown. The cassette's base 502, side wall 504, lid 506, exit hole 516 (FIG. 22) and gate 518 (FIG. 21) are preferably configured and coupled as described above with respect to cassette 400.

According to this embodiment, a ramp 520 is provided about a portion of the inside periphery of the wall 504. The ramp 520 has a width (FIG. 22) less than 1.5 times the diameter of a capsule for which the cassette 500 is intended. The ramp 520 rises from the base 502 in a counterclockwise direction. At the highest rise of the ramp 520, approaching the exit hole 516, a barrier 522 is provided to prevent capsules from being caught under the ramp. The barrier 522 is preferably lower than the ramp surface at that location.

The exit hole 516 is provided with a cover 532 to prevent capsules which are not directed up the ramp from falling therethrough. A guide 524, similar to tablet guide 424, is provided on the base 502. The guide 524 intersects the ramp 520 at location 529 and thereby ensures that capsules can move up the ramp only in a lengthwise direction; capsules otherwise oriented are removed from the ramp 520 by contacting the guide 524.

In use, the cassette 500 is filled with capsules. When the cassette is vibrated counterclockwise, some of the capsules move against the periphery of the wall and up the ramp 520 toward the exit hole 516. Capsules which do not properly fit on the ramp 520 fall off at the approach to the exit hole. Capsules which are not on the ramp 520 move around the base 502, and the guide wall 524 directs such capsules away from a portion of the ramp 520 which approaches the exit hole 516. This prevents a layer of capsules from forming on the base 502 behind the guide wall 524. As such, the capsules reach the exit hole 516 in a single file formation, without tablet stacking which could otherwise jam the exit hole.

The above cassette embodiments permit rapid dispensing of medications stored in the cassettes. However, there may be medications in a pharmacy which are used with an infrequency such that cassette storage is not warranted. Therefore, turning now to FIGS. 25 and 26, according to another aspect of the invention, the system 10 may be used as a pour-through system. When a cassette 16, 216 is not located on the mounting assembly and the shield 132 is removed from over the chute entrance 130, a funnel 134 into which tablets may be poured is provided in the chute entrance. In this pass-through configuration, no preset number is entered prior to pouring tablets into the funnel. Rather, sensor 129 indicates that a cassette is not being used, and the system 10 is automatically adapted to count tablets passing through the funnel. The number of tablets counted is displayed on the display 26.

Figure 4:
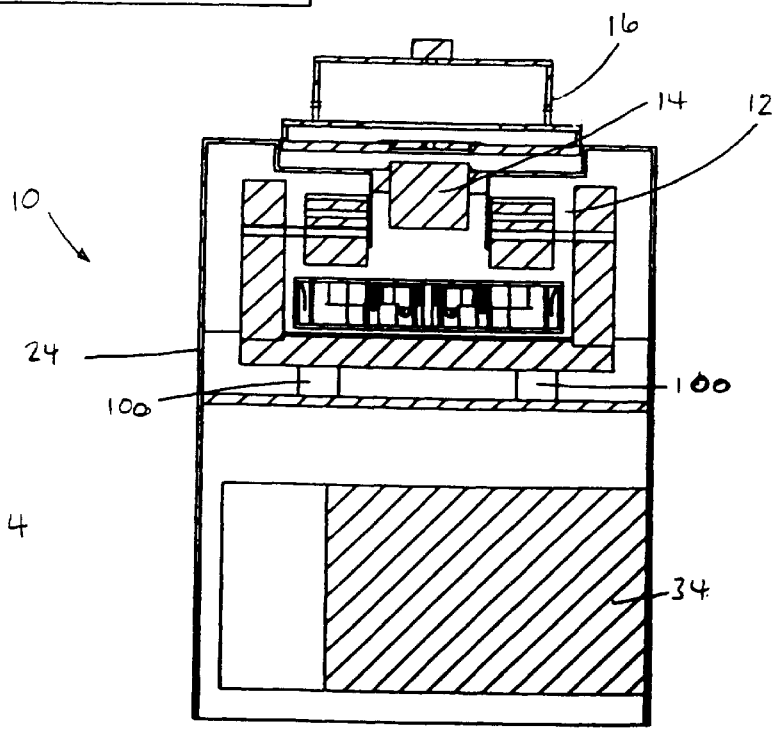
FIG. 4 is a section view across line 4—4 in FIG. 2.
Figure 27:
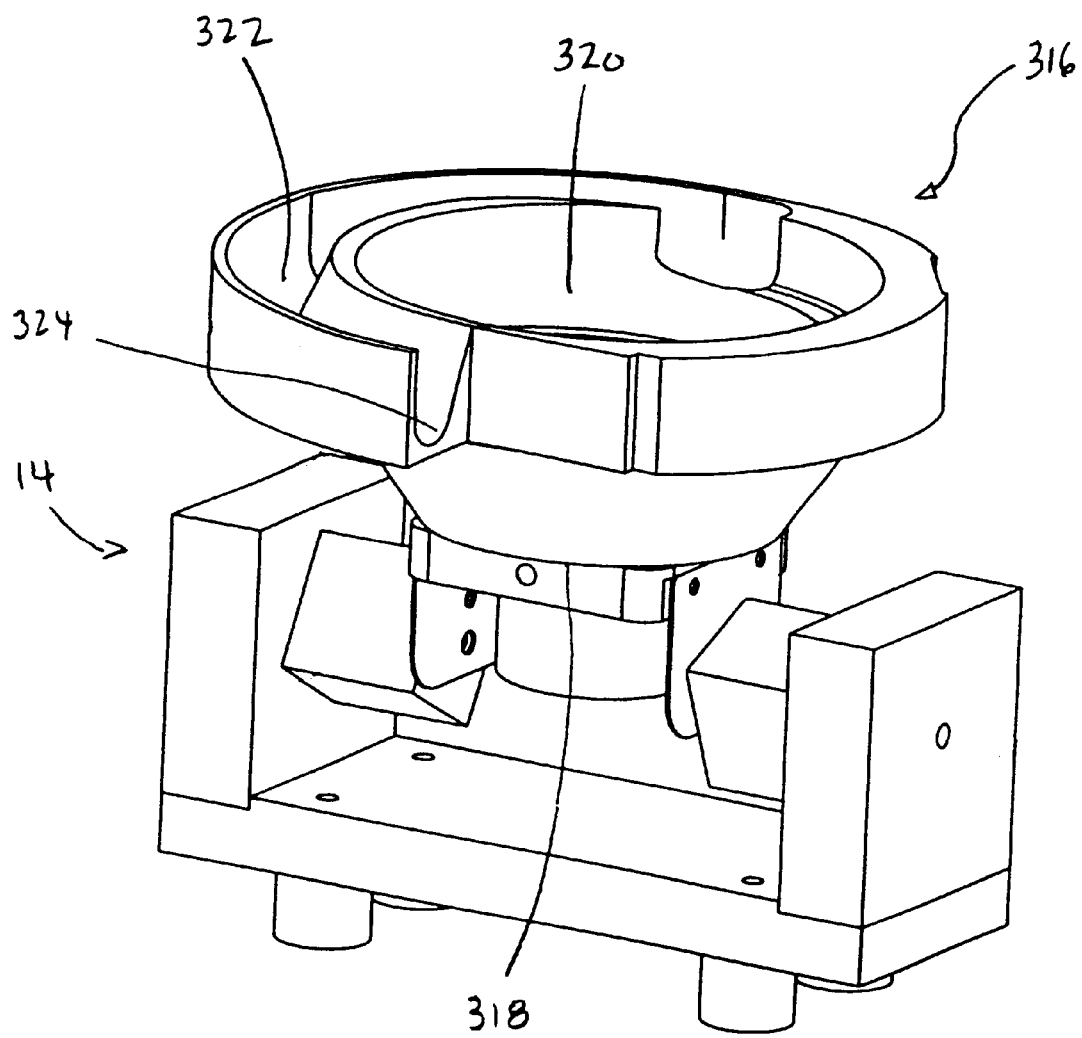
FIG. 27 is a perspective view of a universal vibratory bowl feeder attached to the mounting and vibratory assemblies according to the invention.

Referring now to FIG. 27, according to another aspect of the invention, a universal bowl feeder 316 can be attached to and detached from the mounting assembly 14, preferably in the same manner as the cassettes. As such, the bowl feeder 316 is made from metal or made from plastic and provided with a metal insert or bottom plate, as described with respect to the cassettes. This enables the bottom 318 of the feeder 316 to be mounted to the mounting assembly 14. The feeder 316 has a reservoir 320 which holds tablets, and a ramp 322 designed to feed practically any size or shape tablet or other single dose medication. Bowl feeders with this interior design are available from Kirby Lester Inc. of Stamford, Conn. Referring to FIGS. 4, 15 and 17, the bowl feeder 316 is positionable within the recess 128 such that the sensor 129 causes the system to enter preset counting mode. A desired number of tablets is entered via the keypad 128, and a start button on the keypad is then actuated causing the electromagnet of the mounting assembly 14 to secure the feeder 316 thereto, and the vibration system 16 to vibrate the feeder to feed tablets from the reservoir 320, up a the ramp 322, and to an exit 324, where the tablets fall into the chute entrance 130 and are then counted by the object counting system 22. The feeder accommodates prescriptions which are not provided their own dedicated cassette, but for which a pharmacist does not wish to manually feed tablets until a desired number of tablets is counted.

There have been described and illustrated herein embodiments of a cassette system for feeding, counting, and dispensing tablets, capsules, caplets, and the like. While particular embodiments of the invention have been described, it is not intended that the invention be limited thereto, as it is intended that the invention be as broad in scope as the art will allow and that the specification be read likewise. Thus, while the system is described as being suitable for manual cassette coupling and removal in a pharmacy setting, it will be appreciated that the system may be adapted for a robotic system in a pharmacy setting or otherwise. In addition, while an electromagnetic mounting assembly is preferred, it will be appreciated that other rapid and easy to use coupling systems may also be used. For example, a preferably power-driven mechanical coupling which threadably secures the cassette to the mounting assembly can be used. Further, while cassettes with one and two track layers have been described, it will likewise be appreciated that cassettes with three or more track layers can similarly be used to even more rapidly count tablets. Also, while the feed direction is shown and described as being counterclockwise, it will be appreciated that the shakers can be configured to shake the cassette with clockwise motion, and the guides, narrow, and, in one embodiment, two exit holes can be configured to guide tablets in the clockwise direction toward the exits. Further, while particular opening height and narrow dimensions relative to the tablet size were disclosed as being preferred, it will be appreciated that other dimensions could be utilized. Also, while the system is stated to secure the cassette and to the mounting assembly upon activation of a start button, it will be appreciated that locking may occur based upon the sensor recognizing a cassette or bowl feeder being placed on the mounting assembly. In addition, the release of the gate by the solenoid and the release of the cassette or bowl feeder from the mounting assembly may be triggered by means other than described. Furthermore, the funnel may be permanently coupled to the housing in a manner which permits placement and removal of a cassette in conjunction with the funnel. Also, the system may include a two-layer cassette and have two separate feeds each having a one-dimensional optical system for sensing tablets passing through the feeds, the feeds then going to a common chute or exit spout. It will therefore be appreciated by those skilled in the art that yet other modifications could be made to the provided invention without deviating from its spirit and scope as claimed.

What is claimed is:

1. A cassette for a system for feeding and counting discrete objects, said discrete objects having a height, said cassette comprising:
    a) a substantially horizontal base including an exit hole;
    b) a peripheral wall defining a reservoir adapted to store a plurality of discrete objects; and
    c) a structure about said internal periphery adapted to feed the discrete objects single file toward said exit hole.

2. A cassette according to claim 1, wherein:
    said structure is a lip, and said lip and said base together define a channel adapted to receive the discrete objects in a single file.

3. A cassette according to claim 2, wherein:
    said lip is annular.

4. A cassette according to claim 2, further comprising:
    d) a barrier wall provided against a portion of said lip adjacent said exit hole, such that said exit hole is partially enclosed by said peripheral wall, said barrier wall, and said structure.

5. A cassette according to claim 4, wherein:
    said peripheral wall, said barrier wall, and said structure define a tunnel through which said discrete objects may be fed toward said exit hole.

6. A cassette according to claim 1, wherein:

said structure is a ramp.

7. A cassette according to claim 1, further comprising:

d) a guide provided on said base and extending higher than said structure.

8. A cassette according to claim 7, wherein:

said guide intersects said structure.

9. A cassette according to claim 7, wherein:

said guide is separated from said structure.

10. A cassette according to claim 7, wherein:

said guide includes a leading edge and a terminal edge, wherein said leading edge is provided on one side of an entrance to said exit hole and said terminal edge is provided on the other side of said entrance to said exit hole.

11. A cassette according to claim 10, wherein:

said leading edge is tapered.

12. A cassette according to claim 1, further comprising:

d) a plurality of discrete objects each having a fist width, wherein said structure has a second width less than 1.5 times said first width.

13. A cassette according to claim 12, wherein:

said plurality of discrete objects each has a first height, and said structure is a lip located at a second height above the base which is less than twice said first height, said discrete objects being movable beneath said lip.

14. A cassette for a system for feeding and counting discrete objects, said cassette comprising:

a) a substantially horizontal base including an exit hole;

b) a peripheral wall about said base and having an internal periphery, said base and said peripheral wall defining a reservoir adapted to store a plurality of discrete objects; and c) a lip about said internal periphery, said lip and said base defining a channel which leads to said exit hole.

15. A cassette according to claim 14, further comprising:

d) a guide provided on said base and extending higher than said lip, said guide adapted to direct some discrete objects which are not in said channel away from said exit hole.

16. A cassette for a system for feeding and counting discrete objects, said cassette comprising:

a) a substantially horizontal base including an exit hole;

b) a peripheral wall about said base and having an internal periphery, said base and said peripheral wall defining a reservoir adapted to store a plurality of discrete objects; and c) a ramp extending up from said base and about said internal periphery adapted to feed the discrete objects single file toward said exit hole.

17. A cassette according to claim 16, further comprising:

d) a guide provided on said base and extending higher than said ramp, said guide adapted to direct some discrete objects which are not on said ramp away from said exit hole.

18. A cassette for a system for feeding and counting discrete objects, said discrete objects having a height, said cassette comprising:

a) a base including an exit hole;

b) a peripheral wall about said base and having an internal periphery, said base and said peripheral wall defining a reservoir adapted to store a plurality of discrete objects; and c) a structure about said internal periphery adapted to feed the discrete objects single file toward said exit hole.

19. A cassette for a system for feeding and counting discrete objects, said discrete objects having a height, said cassette comprising:

a) a substantially horizontal base;

b) a peripheral wall about said base and having an internal periphery, said base and said peripheral wall defining a reservoir adapted to store a plurality of discrete objects;

c) an exit for the discrete objects; and d) a structure about said internal periphery adapted to feed the discrete objects single file toward said exit opening.

20. A cassette for a system for feeding and counting discrete objects, said discrete objects having a height, said cassette comprising:

a) a base;

b) a peripheral wall about said base and having an internal periphery, said base and said peripheral wall defining a reservoir adapted to store a plurality of discrete objects;

c) an exit located at or adjacent said peripheral wall;

d) a structure about said internal periphery adapted to feed the discrete objects single file toward said exit; and e) a lid which is coupled to said peripheral wall and encloses said reservoir.

21. A cassette according to claim 20, wherein:

said base is substantially planar.

22. A cassette according to claim 20, wherein:

said exit is provided in said base.

23. A cassette according to claim 22, wherein:

said base is substantially planar.

24. A cassette according to claim 23, wherein:

said base is substantially horizontal.

* * * * *